(12) United States Patent
Iiyama et al.

(10) Patent No.: US 8,278,219 B2
(45) Date of Patent: Oct. 2, 2012

(54) METHOD FOR PURIFYING CHEMICAL ADDED WITH CHELATING AGENT

(75) Inventors: Masamitsu Iiyama, Atsugi (JP); Mitsugu Abe, Atsugi (JP)

(73) Assignee: Nomura Micro Science Co., Ltd., Atsugi-shi (JP)

(*) Notice: Subject to any disclaimer, the term of this patent is extended or adjusted under 35 U.S.C. 154(b) by 628 days.

(21) Appl. No.: 12/517,313

(22) PCT Filed: Nov. 30, 2007

(86) PCT No.: PCT/JP2007/073192
§ 371 (c)(1),
(2), (4) Date: Jun. 2, 2009

(87) PCT Pub. No.: WO2008/069136
PCT Pub. Date: Jun. 12, 2008

(65) Prior Publication Data
US 2010/0078589 A1 Apr. 1, 2010

(30) Foreign Application Priority Data
Dec. 4, 2006 (JP) .................... 2006-327624

(51) Int. Cl.
*H01L 21/302* (2006.01)
*H01L 21/461* (2006.01)

(52) U.S. Cl. ....................................... 438/692

(58) Field of Classification Search .......... 438/692; 216/88, 89
See application file for complete search history.

(56) References Cited

U.S. PATENT DOCUMENTS
2006/0246724 A1  11/2006  Takamatsu

FOREIGN PATENT DOCUMENTS

| JP | 58-216775 A | 12/1983 |
| JP | 61-97096 A | 5/1986 |
| JP | 63-272460 A | 11/1988 |
| JP | 2001-96272 A | 4/2001 |
| JP | 2005-45102 A | 2/2005 |
| JP | 2005-103700 A | 4/2005 |
| JP | 2006-86144 A | 3/2006 |
| WO | WO 2005/010966 A1 | 2/2005 |

OTHER PUBLICATIONS (Translation for JP 2006-086144A. Mar. 30, 2006).*
Shozo Miyahara et al., "Zoho Jitsuyo Ion Kokan", Kabushiki Kaisha Kagaku Kogyosha, Aug. 30, 1984, pp. 3, 12-19, and 179-182.

* cited by examiner

*Primary Examiner* — Roberts Culbert
(74) *Attorney, Agent, or Firm* — Foley & Lardner LLP

(57) ABSTRACT

A chelate complex is removed from a chemical which is used in a semiconductor production process and contains a compound having a chelating ability, and the cleaning load is also reduced. Specifically disclosed is a method for purifying a chemical which is used in a semiconductor production process and contains a compound having a chelating ability, wherein a chelate complex which is formed from impurity metals such as nickel and copper contained in an alkaline chemical is removed from the chemical by treating the alkaline chemical with an organic complex adsorbing material.

8 Claims, 1 Drawing Sheet

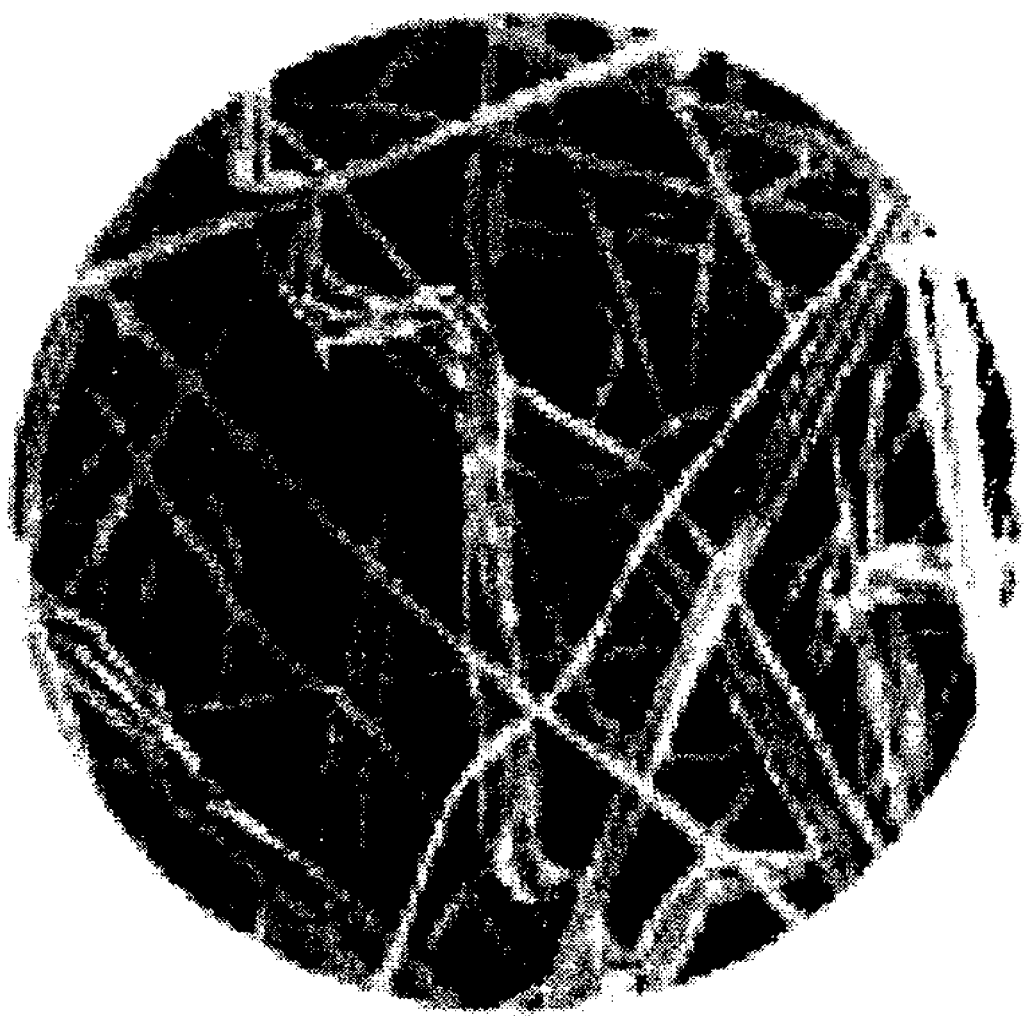

METHOD FOR PURIFYING CHEMICAL ADDED WITH CHELATING AGENT

TECHNICAL FIELD

The present invention relates to a method for purifying a chemical used in a semiconductor production process and containing a compound having a chelating ability, and more particularly to a method for purifying a chemical added with a chelating agent to remove a chelate complex, which is formed from the chelating agent and impurity metals, from the chemical added with the chelating agent used in the semiconductor production process.

BACKGROUND ART

The semiconductor wafer is produced as a product through plural production processes. Among the production processes, a chemical mechanical polishing process polishes a wafer surface by a cloth (polishing cloth) which is contacted to it by a polishing apparatus while performing circulation supply of a polishing slurry thereto.

This slurry might contain an ionized metal such as copper, nickel, iron or the like in a mixed form. Namely, alkali is used as one of components of the polishing slurry. Especially, alkali, for example, sodium hydroxide is produced by electrolysis of salt, and the produced sodium hydroxide contains various types of metal impurities of the order of several ppm.

In the chemical mechanical polishing process on a wafer having a copper film formed on it, copper is dispersed into the slurry and partly ionized by polishing.

Metals such as calcium, magnesium, manganese, iron, cobalt, zinc, aluminum and lead are hardly dispersed into the silicon wafer but remain as residues on its surface.

Among the metal impurities, for example, copper and nickel penetrate into the silicon wafer to remain in it and change electric properties to inhibit flattening of the surface. When the metals such as copper and nickel which easily diffuse into the wafer and other metals which remain on the wafer surface are considered for their influences depending on their concentrations, the concentrations of the metals which easily diffuse must be sometimes reduced to $\frac{1}{10}$ to $\frac{1}{1000}$ in comparison with those which remain on the surface. Therefore, when the slurry containing metal impurities of copper, nickel and the like is used to polish the wafer, there is a problem that a yield is decreased because the metals diffuse into the wafer and then are deposited on the wafer surface by heat treatment of the wafer performed later, a long-time storage, or the like.

Impurity metals such as calcium, magnesium, manganese, iron, cobalt, zinc, aluminum and lead also inhibit electric properties and others, so that if such impurity metals are contained in a polishing liquid in the chemical mechanical polishing process, they become loads in the subsequent washing process.

To deal with the above problems, there is proposed a chelating agent adding method by which a chelating agent is added to a slurry to form a metal complex (see, for example, JP-A 63-272460 (KOKAI)).

According to the chelating agent adding method, the chelating agent added to the polishing slurry is bonded to the metal to form a metal complex, and the metal complex electrically repels from the wafer to prevent metal contamination.

But, if the metal complex remains on the wafer surface, electric properties and others are also inhibited, so that if it is contained in the chemical or the polishing liquid in the alkali etching process or the polishing process, it increases the load in the subsequent washing process.

An amount of metal contamination decreases as the added amount of the chelating agent increases, but if the added amount of the chelating agent becomes large, a polishing rate of the wafer decreases, and therefore the added amount of the chelating agent is desirably as small as possible (see, for example, JP-A 2005-103700 (KOKAI)).

[Reference 1] JP-A 63-272460 (KOKAI)
[Reference 2] JP-A 2005-103700 (KOKAI)

DISCLOSURE OF THE INVENTION

The inventors have made devoted studies to remedy the above-described existing disadvantages and found that the above-described problems are remedied by removing a chelate complex from a chemical containing a compound having a chelating ability used in a semiconductor production process, and it is possible to minimize the added amount of the chelating agent.

The present invention has been completed based on the above-described finding and provides a method for purifying a chelating agent-added chemical, comprising removing a chelate complex, which is formed from a compound having the chelating ability and impurity metals, from the chemical containing the compound having a chelating ability used in a semiconductor production process, to prevent the metal contamination of the wafer and to reduce a washing load for the wafer treated with the chemical.

The present invention also provides a method for purifying a chelating agent-added chemical, which has made it possible to minimize the added amount of the chelating agent.

A method for purifying a chelating agent-added chemical according to the present invention, which purifies a chemical containing a compound having a chelating ability used in a semiconductor production process, comprises treating the chemical with an organic complex adsorbing material to remove a chelate complex which is formed from the compound and impurity metals contained in the chemical.

The chemical containing the compound having the chelating ability used in the semiconductor production process is normally alkali and contains trace amounts of various types of impurity metals as impurities, namely nickel and copper, and they form a chelate complex from the chelating agent added to the chemical.

The chemical to be treated by the present invention is normally a polishing slurry for a semiconductor or an aqueous solution or an aqueous dispersion containing at least one kind selected from ammonia, tetramethylammonium, sodium hydroxide, potassium hydroxide, sodium carbonate, potassium carbonate, sodium hydrogencarbonate, potassium hydrogencarbonate and choline, and particularly a polishing slurry for a semiconductor, to which added is at least one kind selected from ammonia, tetramethylammonium, sodium hydroxide, potassium hydroxide and choline.

An example of the compound having a chelating ability contained in the chemical to be treated according to the present invention is composed of at least one kind selected from amines, aminocarboxylic acids, hydroxylamines, phosphoric acids, thio compounds and other substances having a functional group having a chelating ability of such compounds, but not limited to them. A typical chelating agent is ethylene diamine tetra-acetic acid (EDTA).

An example of the organic complex adsorbing material used in the present invention is a substance having a functional group represented by the following formula (1).

[Chemical formula 1]

(1)

(where, R1, R2 and R3 denote the same or different monovalent group selected from a hydrogen atom, an alkyl group having a carbon number of 1 to 4, a hydroxyethyl group and a hydroxypropyl group).

Especially, a suitable one is a substance having a functional group having a tertiary amine structure wherein the R1 in the formula (1) denotes a hydrogen atom, and the R2 and R3 denote the same or different alkyl group having a carbon number of 1 to 4, namely a substance wherein the R1 in the formula (1) denotes a hydrogen atom, and the R2 and R3 denote the same or different alkyl group having a carbon number of 1 to 4.

Generally, a substance having properties as a weakly-basic anion exchange body can be used as the organic complex adsorbing material of the invention.

Such an organic complex adsorbing material is preferably formed to have a bead shape, a fiber shape or a film shape.

Besides, such an organic complex adsorbing material is suitably composed of an anion exchange body which is previously treated with an alkaline aqueous solution such as an aqueous sodium hydroxide solution to reduce a pH change of a chemical to be purified with the terminal group of an anion-exchange functional group determined to be a base type (OH type).

And, such an organic complex adsorbing material may have the terminal group of an anion-exchange functional group determined to be a salt type which forms the main component of the chemical to be treated.

For example, a system may be configured to fill such an organic complex adsorbing material in one kind or two kinds or more into a column or a tower, to fill them in a mixed or layered form when they are used in two kinds or more, and to pass the chemical to be treated into the column or the tower for treatment.

The system may also be configured by connecting the column or the tower in plural to treat the chemical by passing into the columns or the towers.

The organic complex adsorbing material and the chemical to be treated may be housed into a reaction vessel without using the column or the tower to treat the chemical to be treated by contacting the chemical to be treated to the organic complex adsorbing material.

In this case, when the organic complex adsorbing material has a bead shape or a short fiber shape, both of them are flown in the reaction vessel, and the chemical to be treated can be treated by filtering. Otherwise, when the organic complex adsorbing material, which has a long fiber shape or a film shape formed by further enhancing denseness, has a spiral shape or a porous sheet shape, the treatment can be made with these organic complex adsorbing bodies arranged in a layered form in the reaction vessel and passing the chemical to be treated through the layer. Besides, the organic complex adsorbing bodies may be formed into a cartridge filter shape.

Then, the action and effect of the invention are described with reference to a case of applying to purification of a slurry used in the chemical mechanical polishing process for the semiconductor device (wafer).

By the chemical mechanical polishing process, a slurry having ammonia, tetramethylammonium, sodium hydroxide, potassium hydroxide or choline dissolved is supplied from a slurry supply vessel to a polishing apparatus. The slurry is partly extracted for measurement of a metal amount and components, and its remaining is returned to the slurry supply vessel and circulated again between the slurry supply vessel and the polishing apparatus.

Since the slurry returned from the polishing apparatus contains metal components, the chelating agent in a calculation amount for chelating the metal components is added to the slurry. Meanwhile, deficient components are replenished to prepare the components.

When the semiconductor device is polished, the metals are successively supplied into the slurry, and a chelate complex accumulates in the slurry when the slurry is circulated between the slurry supply vessel and the polishing apparatus. Thus, the chelate complex adheres to the surface of the semiconductor device and increases a washing load. The chelate complex not removed by washing becomes carbide in the subsequent heat treatment process and causes a defect in the semiconductor device.

According to the invention, the chelate complex in the slurry is removed by treating with the organic complex adsorbing material.

For example, an anion exchange body is used as the organic complex adsorbing material. Specifically, the chelate complex is generally composed of a compound, which forms anions by discharging hydrogen ions in an alkaline aqueous solution or aqueous dispersion, such as a carboxyl group, so that it can be removed by the anion exchange body. At this time, a weakly-basic anion exchange body is preferable not to change the pH of the slurry, and an anion exchange body having a tertiary ammonium group is particularly suitable.

Thus, the slurry from which the chelate complex and the chelating agent have been removed by adsorbing is supplied to the polishing apparatus again after its components are adjusted.

According to the invention, the impurity metal ions in the chemical are removed as the chelate complex by the chelating agent, and the chelate complex is removed out of the system by the organic complex adsorbing material, so that a washing load after the above process can be reduced.

Many metal chemical species (impurities) which are present as anions in the alkaline aqueous solution are removable by previously treating the terminal group of the anion exchange body of the organic complex adsorbing material into an OH type, and since a concentration of the alkaline aqueous solution does not change, high polishing efficiency can be maintained.

BRIEF DESCRIPTION OF THE DRAWING

FIG. 1 is a magnified photograph of the organic complex adsorbing material used in examples of the invention.

BEST MODE FOR CARRYING OUT THE INVENTION

Examples of the invention are described below.

EXAMPLES

Preparation of Sample Solution

An aqueous 48% sodium hydroxide solution manufactured by Asahi Glass Co., Ltd., an aqueous 48% potassium hydroxide solution manufactured by Asahi Glass Co., Ltd., a special grade of sodium carbonate, potassium carbonate, sodium hydrogencarbonate and potassium hydrogencarbonate manufactured by Wako Pure Chemical Industries, Ltd., 28% ammonia water manufactured by TOMIYAMA PURE CHEMICAL INDUSTRIES, LTD., a special grade of tetramethylammonium hydroxide pentahydrate manufactured by KANTO CHEMICAL CO., INC., and an aqueous 75% holine chloride solution manufactured by MITSUBISHI GAS CHEMICAL COMPANY, INC. were used. The following Nos. 1 to 40 chelating agents each in 20 ppm were dissolved in the individual kinds of solutions, and then nickel and copper added to a sample solution so to have 0.1 ppm of nickel and 0.1 ppm of copper. Thus, a nickel chelate complex and a copper chelate complex were formed.

EDTA 20 ppm was also dissolved into silica base semiconductor polishing slurry SS25 manufactured by Cabot Corporation, and nickel and copper was added into a sample solution so as to have concentrations of 0.1 ppm of nickel and 0.1 ppm of copper, thereby forming a nickel chelate complex and a copper chelate complex.

[Removal of Chelate Complex]

The nickel chelate and the copper chelate in the prepared sample solution were removed by the following method.

Extra-pure water was used for all of dissolving, diluting and the like in the experiments, and ICP-AES (CIROS120 manufactured by Rigaku Corporation) was used for measurement of metal impurities.

A treating apparatus and a treating body (organic complex adsorbing material) used in the following Examples and Comparative Examples are as follows.

[Treating Apparatus]:
Treating body-packed column: ¾-inch PFA column 200 mm
 (PFA: tetrafluoroethylene-perfluoroalkylvinylether copolymer)
Material of test system and used tank: PTFE (Polytetrafluoroethylene)
Film testing holder: 47φ PTFE
[Used Treating Body]:
(A) Strongly Basic Anion Exchange Fiber:
 Manufacturer: NITIVY CO., LTD.
 Trade name: IEF-SA
 Base material: Polyvinyl alcohol
 Functional group: Quaternary ammonium group
 Shape: Fiber shape, diameter 100 μm, length 2 to 5 mm
(B) Weakly-Basic Anion Exchange Fiber:
 Manufacturer: NITIVY CO., LTD.
 Trade name: IEF-WA
 Base material: Polyvinyl alcohol
 Functional group: Primary to tertiary ammonium groups
 Shape: Fiber shape, diameter 100 μm, length 2 to 5 mm
(C) Weakly-Basic Anion Exchange Resin:
 Manufacturer: Rohm and Haas Japan
 Trade name: DUOLITE A378D
 Base material: Styrene-divinylbenzene copolymer
 Functional group: Primary to tertiary ammonium groups
 Shape: Bead shape, diameter 400 to 650 μm
(D) Strongly Basic Anion Exchange Resin (Type I):
 Manufacturer: Rohm and Haas Japan
 Trade name: A201CL
 Base material: Styrene-divinylbenzene copolymer
 Functional group: Quaternary ammonium group (type I)
 Shape: Bead shape, particle diameter 500 to 750 μm
(E) Strongly Basic Anion Exchange Resin (Type II):
 Manufacturer: Rohm and Haas Japan
 Trade name: A162LF
 Base material: Styrene-divinylbenzene copolymer
 Functional group: Quaternary ammonium group (type II)
 Shape: Bead shape, particle diameter 500 to 1100 μm
(F) Strongly Acidic Cation Exchange Resin:
 Manufacturer: Rohm and Haas Japan
 Trade name: DUOLITE C255LFH
 Base material: Styrene-divinylbenzene copolymer
 Functional group: Sulfonic acid group
 Shape: Bead shape, particle diameter 550 μm
(G) Weakly Acidic Cation Exchange Resin:
 Manufacturer: Rohm and Haas Japan
 Trade name: DUOLITE C433LF
 Base material: Acrylic
 Functional group: Carboxylic acid group
 Shape: Bead shape, particle diameter 600 to 800 μm
(H) Chelate Fiber:
 Manufacturer: NITIVY CO., LTD.
 Trade name: IEF-IAc
 Base material: Polyvinyl alcohol
 Functional group: Iminoacetic acid
 Shape: Fiber shape, diameter 100 μm, length 2 to 5 mm
(I) Weakly-Basic Anionic Exchange Membrane:
 Manufacturer: Asahi Glass Co., Ltd.
 Trade name: SELEMION AAV
 Film thickness: 130 μm
 Film shape: 100 cm×50 cm
[Used Chelating Agents]
1. EDTA: Ethylenediamine triacetic acid
2. BAPTA O,O'-Bis(2-aminophenyl)ethyleneglycol-N,N,N', N'-tetraacetic acid, tetrapotassium salt, hydrate
3. Bicine N,N-Bis(2-hydroxyethyl)glycine
4. CyDTA trans-1,2-diaminocyclohexane-N,N,N',N'-tetraacetic acid, monohydrate
5. DTPA Diethylenetriamine-N,N,N',N'',N''-pentaacetic acid
6. EDDP Ethylenediamine-N,N'-dipropionic acid, dihydrochloride
7. EDTA-OH N-(2-Hydroxyethyl)ethylenediamine-N,N',N'-triacetic acid
8. GEDTA (EGTA) O,O'-Bis(2-aminoethyl)ethyleneglycol-N,N,N', N'-tetraacetic acid
9. HIDA N-(2-Hydroxyethyl)iminodiacetic acid
10. IDA Iminodiacetic acid
11. NTA Nitrilotriacetic acid
12. NTPO Nitrilotris(methylenephosphonic acid), trisodium salt
13. TTHA Triethylenetetramine-N,N,N',N'',N''',N'''-hexaacetic acid
14. 5-Br-PAPS 2-(5-Bromo-2-pyridylazo)-5-[N-n-propyl-N-(3-sulfopropyl)amino]phenol, disodium salt, dehydrate
15. 5-Br-PSAA 2-(5-Bromo-2-pyridylazo)-5-[N-n-propyl-N-(3-sulfopropyl)amino]aniline, sodium salt
16. Azomethine H 8-Hydroxy-1-(salicylideneamino)-3,6-naphthalenedisulfonic acid, disodium salt
17. BT 2-Hydroxy-1-(1-hydroxy-2-naphthylazo)-6-nitro-4-naphthalenesulfonic acid, sodium salt
18. Calcein Bis[N,N-bis(carboxymethyl)aminomethyl]fluorescein
19. Calcein Blue 8-[N,N-Bis(carboxymethyl)aminomethyl]-4-methylumbelliferone
20. Chlorophosphonazo-III 2,7-Bis(4-chloro-2-phosphonophenylazo)-1,8-dihydroxy-3,6-naphthalenedisulfonic acid, disodium salt
21. Nitroso-PSAP 2-Nitroso-5-[N-n-propyl-N-(3-sulfopropyl)amino]phenol
22. Nitro-PAPS 2-(5-Nitro-2-pyridylazo)-5-[N-n-propyl-N-(3-sulfopropyl)amino]phenol, disodium salt, dehydrate
23. NN 2-Hydroxy-1-(2-hydroxy-4-sulfo-1-naphthylazo)-3-naphthoic acid 24. PAR 4-(2-Pyridylazo)resorcinol
25. PR Pyrogallol sulfonphthalein Sodium bicinchoninate 4,4'-Dicarboxy-2,2'-biquinoline, disodium salt
26. Tiron 1,2-Dihydroxy-3,5-benzenedisulfonic acid, disodium salt, monohydrate
27. TPPS 5,10,15,20-Tetraphenyl-21H,23H-porphinetetrasulfonic acid, disulfuric acid, tetrahydrate
28. XO 3,3'-Bis[N,N-bis(carboxymethyl)aminomethyl]-o cresolsulfonphthalein, disodium salt
29. Zincon 2-[1-(2-Hydroxy-5-sulfophenyl)-3-phenyl-5-formazano]benzoic acid, monosodium
30. Murexide Purpuric acid, ammonium salt
31. XB-I 3-[3-(2,4-Dimethylphenylcarbamoyl)-2-hydroxynaphthalen-1-yl-azo]-4-hydroxybenzenesulfonic acid, sodium salt All the above chelating agents are products of Chelest Corporation.

32. EDTMP: Etylene diamine tetra(methylene phosphonic acid)
33. HEDTA: Hydroxyethyl Ethylene Diamine Triacetic Acid
34. GLDA: Dicarboxymethyl Glutamic Acid Tetrasodium Salt
35. DHEG: Dihydroxyethyl Glycine
36. PDTA: 1,3-Propanediamine Tetraacetic Acid
37. DPTA-OH: 1,3-Diamino-2-hydroxypropane Tetraacetic Acid
38. HEDP: Hydroxyethylidene Diphosphonic Acid
39. NTMP: Nitrilotris Methylene Phosphonic Acid
40. PBTC: (Phosphonobutane Tricarboxylic Acid)

All the above chelating agents are products of DOJINDO LABORATORIES.

In the following Examples and Comparative Examples, the used adsorbing bodies were denoted by abbreviations of the above-described (A), (B), ..., and the chelating agents were indicated by abbreviations of the above-described 1, 2, .... The ion exchange bodies of (A), (B), (C), (D) and (E) used for the treatment had 90% or more of the terminal group as the OH group. And, (F), (G) and (H) were used after treating to be the cation type of the primary component of the treated chemical.

(Washing of Used Apparatuses)

All of the PTFE tank (volume 1200 ml), the PFA column (diameter ¾ inch, length 200 mm), the sampling PP (polypropylene) vessel (volume 1000 ml) and the PTFE film testing holder 47φ were previously immersed in 1N nitric acid for one hour or more and washed by running extra-pure water in order to remove metal contamination.

The nitric acid used for washing is an electronic industry grade (EL) manufactured by KANTO CHEMICAL CO., INC. and diluted with extra-pure water so as to be about 1N. The extra-pure water was manufactured by an extra-pure water production system and had a metal content of 1 ppt or below.

The PTFE tank and the PFA column washed by the above-described washing method were sequentially connected in this order by PFA piping. Analyzed results of a blank test system when the extra-pure water was flown through the system and received by the PE vessel at the outlet of the PFA column are shown in Table 1. It is apparent from the table that no contamination was caused by this system at all.

TABLE 1

| Blank test system measured results | |
|---|---|
| Nickel | <1 ppt |
| Copper | <1 ppt |

(Treatment Operation)

The adsorbing bodies of (A) to (H) having the terminal group treated such that the component concentration of the object chemical did not change were filled in the PFA column (diameter ¾ inch, length 200 mm). Filling was performed by gradually pushing the adsorbing material lightly by a thoroughly washed PTFE push rod so that the column interior became dense.

The extra-pure water was flown through the PFA column, which was filled with the adsorbing material, at 10 ml/min for twelve hours or more to rinse thoroughly the eluted metal and organic substance. The PTFE tank was dried well so that no water drop remains in it, and a sample solution was charged into it. The PTFE tank into which the sample solution was charged and the PFA column washed and filled with the filler were mutually connected by a ¼-inch PFA tube, and the sampling vessel was provided at the outlet of the PFA column.

Nitrogen gas was introduced into the PTFE tank from its above, the pressure in the vessel was pressurized to 0.1 MPa, a flow control valve was operated to adjust an outlet velocity of the sample solution flowing out of the outlet of the PFA column to 5 ml/min or below.

The pH of the flown out sample solution was measured by a pH-test paper, and when the pH became the same as that of the supplied sample solution, the solution at the outlet of the PFA column was received as a sample by the PE vessel.

The sample solution received by the PE vessel was sealed and analyzed for nickel and copper by the ICP-AES.

For the analysis by the ICP-AES, desalting treatment was performed as pretreatment before introduction into the analyzer if necessary.

This Example and the following Examples and Comparative Examples were performed under conditions that the amount of the treating body was 40 ml, the sample flow rate was 5 ml/min or below, a flowing liquid amount was 1000 ml, the liquid was passed one time, and the temperature was in a range of 20 to 25 degrees C. But, an alkaline aqueous solution of 25 degrees C. or more can also be used if the used members have heat resistance.

A removal test of a nickel chelate complex and a copper chelate complex was performed according to a batch method that a sample solution 200 ml and the adsorbing bodies of (A) to (H) were added into a PP (polypropylene) vessel (volume 250 ml), which was immersed in 1N nitric acid for one hour or more in the same manner as above and washed by running extra-pure water, and contacted for 24 hours.

Besides, a flat film having (I) and (B) woven therein as shown in FIG. 1 was loaded on the PTFE film testing holder 47φ, and 48% sodium hydroxide added with an EDTA copper chelate complex was supplied to perform the removal test.

Example 1

The results obtained by performing the above-described treatment operation using 28% ammonia water as the sample solution are shown in Tables 2 to 9.

TABLE 2

(A)

(ppm)

| | Stock solution | 1 | 2 | 3 | 4 | 5 | 6 | 7 | 8 | 9 | 10 | 11 | 12 | 13 |
|---|---|---|---|---|---|---|---|---|---|---|---|---|---|---|
| Nickel | 0.1 | 0.09 | 0.1 | 0.1 | 0.08 | 0.08 | 0.1 | 0.09 | 0.08 | 0.1 | 0.1 | 0.08 | 0.09 | 0.07 |
| Copper | 0.09 | 0.08 | 0.09 | 0.09 | 0.07 | 0.08 | 0.09 | 0.09 | 0.08 | 0.09 | 0.09 | 0.07 | 0.09 | 0.06 |

| | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| Nickel | 0.1 | 0.1 | 0.09 | 0.1 | 0.09 | 0.1 | 0.07 | 0.1 | 0.1 | 0.1 | 0.1 | 0.08 | 0.1 | 0.07 |
| Copper | 0.09 | 0.09 | 0.09 | 0.09 | 0.08 | 0.09 | 0.06 | 0.09 | 0.09 | 0.09 | 0.09 | 0.07 | 0.09 | 0.06 |

| | 28 | 29 | 30 | 31 | 32 | 33 | 34 | 35 | 36 | 37 | 38 | 39 | 40 |
|---|---|---|---|---|---|---|---|---|---|---|---|---|---|
| Nickel | 0.09 | 0.09 | 0.08 | 0.1 | 0.1 | 0.09 | 0.07 | 0.09 | 0.07 | 0.09 | 0.1 | 0.1 | 0.07 |
| Copper | 0.08 | 0.09 | 0.08 | 0.09 | 0.08 | 0.07 | 0.09 | 0.08 | 0.07 | 0.08 | 0.09 | 0.09 | 0.06 |

TABLE 3

(B)

(ppm)

| | Stock solution | 1 | 2 | 3 | 4 | 5 | 6 | 7 | 8 | 9 | 10 | 11 | 12 | 13 |
|---|---|---|---|---|---|---|---|---|---|---|---|---|---|---|
| Nickel | 0.1 | <0.01 | <0.01 | <0.01 | <0.01 | <0.01 | <0.01 | <0.01 | <0.01 | <0.01 | <0.01 | <0.01 | <0.01 | <0.01 |
| Copper | 0.09 | <0.01 | <0.01 | <0.01 | <0.01 | <0.01 | <0.01 | <0.01 | <0.01 | <0.01 | <0.01 | <0.01 | <0.01 | <0.01 |

| | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| Nickel | <0.01 | <0.01 | <0.01 | <0.01 | <0.01 | <0.01 | <0.01 | <0.01 | <0.01 | <0.01 | <0.01 | <0.01 | <0.01 | <0.01 |
| Copper | <0.01 | <0.01 | <0.01 | <0.01 | <0.01 | <0.01 | <0.01 | <0.01 | <0.01 | <0.01 | <0.01 | <0.01 | <0.01 | <0.01 |

| | 28 | 29 | 30 | 31 | 32 | 33 | 34 | 35 | 36 | 37 | 38 | 39 | 40 |
|---|---|---|---|---|---|---|---|---|---|---|---|---|---|
| Nickel | <0.01 | <0.01 | <0.01 | <0.01 | <0.01 | <0.01 | <0.01 | <0.01 | <0.01 | <0.01 | <0.01 | <0.01 | <0.01 |
| Copper | <0.01 | <0.01 | <0.01 | <0.01 | <0.01 | <0.01 | <0.01 | <0.01 | <0.01 | <0.01 | <0.01 | <0.01 | <0.01 |

TABLE 4

(C)

(ppm)

| | Stock solution | 1 | 2 | 3 | 4 | 5 | 6 | 7 | 8 | 9 | 10 | 11 | 12 | 13 |
|---|---|---|---|---|---|---|---|---|---|---|---|---|---|---|
| Nickel | 0.1 | <0.01 | <0.01 | <0.01 | <0.01 | <0.01 | <0.01 | <0.01 | <0.01 | <0.01 | <0.01 | <0.01 | <0.01 | <0.01 |
| Copper | 0.09 | <0.01 | <0.01 | <0.01 | <0.01 | <0.01 | <0.01 | <0.01 | <0.01 | <0.01 | <0.01 | <0.01 | <0.01 | <0.01 |

| | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| Nickel | <0.01 | <0.01 | <0.01 | <0.01 | <0.01 | <0.01 | <0.01 | <0.01 | <0.01 | <0.01 | <0.01 | <0.01 | <0.01 | <0.01 |
| Copper | <0.01 | <0.01 | <0.01 | <0.01 | <0.01 | <0.01 | <0.01 | <0.01 | <0.01 | <0.01 | <0.01 | <0.01 | <0.01 | <0.01 |

| | 28 | 29 | 30 | 31 | 32 | 33 | 34 | 35 | 36 | 37 | 38 | 39 | 40 |
|---|---|---|---|---|---|---|---|---|---|---|---|---|---|
| Nickel | <0.01 | <0.01 | <0.01 | <0.01 | <0.01 | <0.01 | <0.01 | <0.01 | <0.01 | <0.01 | <0.01 | <0.01 | <0.01 |
| Copper | <0.01 | <0.01 | <0.01 | <0.01 | <0.01 | <0.01 | <0.01 | <0.01 | <0.01 | <0.01 | <0.01 | <0.01 | <0.01 |

TABLE 5

(D)

(ppm)

| | Stock solution | 1 | 2 | 3 | 4 | 5 | 6 | 7 | 8 | 9 | 10 | 11 | 12 | 13 |
|---|---|---|---|---|---|---|---|---|---|---|---|---|---|---|
| Nickel | 0.1 | 0.09 | 0.1 | 0.1 | 0.08 | 0.08 | 0.1 | 0.09 | 0.08 | 0.1 | 0.1 | 0.08 | 0.09 | 0.07 |
| Copper | 0.09 | 0.08 | 0.09 | 0.09 | 0.07 | 0.08 | 0.09 | 0.09 | 0.08 | 0.09 | 0.09 | 0.07 | 0.09 | 0.06 |

| | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| Nickel | 0.1 | 0.1 | 0.09 | 0.1 | 0.09 | 0.1 | 0.1 | 0.09 | 0.1 | 0.1 | 0.08 | 0.08 | 0.1 | 0.09 |
| Copper | 0.09 | 0.09 | 0.09 | 0.09 | 0.08 | 0.09 | 0.09 | 0.08 | 0.09 | 0.09 | 0.07 | 0.08 | 0.09 | 0.09 |

| | 28 | 29 | 30 | 31 | 32 | 33 | 34 | 35 | 36 | 37 | 38 | 39 | 40 |
|---|---|---|---|---|---|---|---|---|---|---|---|---|---|
| Nickel | 0.08 | 0.1 | 0.1 | 0.08 | 0.09 | 0.07 | 0.1 | 0.1 | 0.09 | 0.1 | 0.09 | 0.1 | 0.1 |
| Copper | 0.08 | 0.09 | 0.09 | 0.07 | 0.09 | 0.06 | 0.09 | 0.09 | 0.09 | 0.09 | 0.08 | 0.09 | 0.09 |

TABLE 6

(E)

(ppm)

| | Stock solution | 1 | 2 | 3 | 4 | 5 | 6 | 7 | 8 | 9 | 10 | 11 | 12 | 13 |
|---|---|---|---|---|---|---|---|---|---|---|---|---|---|---|
| Nickel | 0.1 | 0.07 | 0.09 | 0.1 | 0.07 | 0.06 | 0.1 | 0.08 | 0.08 | 0.1 | 0.1 | 0.07 | 0.07 | 0.06 |
| Copper | 0.09 | 0.06 | 0.09 | 0.09 | 0.07 | 0.06 | 0.09 | 0.08 | 0.07 | 0.09 | 0.09 | 0.06 | 0.08 | 0.06 |

| | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| Nickel | 0.1 | 0.1 | 0.06 | 0.1 | 0.08 | 0.1 | 0.1 | 0.08 | 0.09 | 0.1 | 0.07 | 0.06 | 0.1 | 0.08 |
| Copper | 0.09 | 0.09 | 0.06 | 0.09 | 0.07 | 0.09 | 0.09 | 0.07 | 0.08 | 0.09 | 0.07 | 0.06 | 0.09 | 0.08 |

| | 28 | 29 | 30 | 31 | 32 | 33 | 34 | 35 | 36 | 37 | 38 | 39 | 40 |
|---|---|---|---|---|---|---|---|---|---|---|---|---|---|
| Nickel | 0.07 | 0.1 | 0.1 | 0.06 | 0.08 | 0.06 | 0.1 | 0.1 | 0.08 | 0.09 | 0.07 | 0.1 | 0.1 |
| Copper | 0.07 | 0.09 | 0.09 | 0.06 | 0.08 | 0.05 | 0.09 | 0.09 | 0.08 | 0.08 | 0.06 | 0.08 | 0.08 |

TABLE 7

(F)

(ppm)

| | Stock solution | 1 | 2 | 3 | 4 | 5 | 6 | 7 | 8 | 9 | 10 | 11 | 12 | 13 |
|---|---|---|---|---|---|---|---|---|---|---|---|---|---|---|
| Nickel | 0.1 | 0.1 | 0.1 | 0.1 | 0.1 | 0.1 | 0.1 | 0.1 | 0.1 | 0.1 | 0.1 | 0.1 | 0.1 | 0.1 |
| Copper | 0.09 | 0.09 | 0.09 | 0.09 | 0.09 | 0.09 | 0.09 | 0.09 | 0.09 | 0.09 | 0.09 | 0.09 | 0.09 | 0.09 |

| | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| Nickel | 0.1 | 0.1 | 0.1 | 0.1 | 0.1 | 0.1 | 0.1 | 0.1 | 0.1 | 0.1 | 0.1 | 0.1 | 0.1 | 0.1 |
| Copper | 0.09 | 0.09 | 0.09 | 0.09 | 0.09 | 0.09 | 0.09 | 0.09 | 0.09 | 0.09 | 0.09 | 0.09 | 0.09 | 0.09 |

| | 28 | 29 | 30 | 31 | 32 | 33 | 34 | 35 | 36 | 37 | 38 | 39 | 40 |
|---|---|---|---|---|---|---|---|---|---|---|---|---|---|
| Nickel | 0.1 | 0.1 | 0.1 | 0.1 | 0.1 | 0.1 | 0.1 | 0.1 | 0.1 | 0.1 | 0.1 | 0.1 | 0.1 |
| Copper | 0.09 | 0.09 | 0.09 | 0.09 | 0.09 | 0.09 | 0.09 | 0.09 | 0.09 | 0.09 | 0.09 | 0.09 | 0.09 |

TABLE 8

(G)

(ppm)

| | Stock solution | 1 | 2 | 3 | 4 | 5 | 6 | 7 | 8 | 9 | 10 | 11 | 12 | 13 |
|---|---|---|---|---|---|---|---|---|---|---|---|---|---|---|
| Nickel | 0.1 | 0.1 | 0.1 | 0.1 | 0.1 | 0.1 | 0.1 | 0.1 | 0.1 | 0.1 | 0.1 | 0.1 | 0.1 | 0.1 |
| Copper | 0.09 | 0.09 | 0.09 | 0.09 | 0.09 | 0.09 | 0.09 | 0.09 | 0.09 | 0.09 | 0.09 | 0.09 | 0.09 | 0.09 |

| | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| Nickel | 0.1 | 0.1 | 0.1 | 0.1 | 0.1 | 0.1 | 0.1 | 0.1 | 0.1 | 0.1 | 0.1 | 0.1 | 0.1 | 0.1 |
| Copper | 0.09 | 0.09 | 0.09 | 0.09 | 0.09 | 0.09 | 0.09 | 0.09 | 0.09 | 0.09 | 0.09 | 0.09 | 0.09 | 0.09 |

| | 28 | 29 | 30 | 31 | 32 | 33 | 34 | 35 | 36 | 37 | 38 | 39 | 40 |
|---|---|---|---|---|---|---|---|---|---|---|---|---|---|
| Nickel | 0.1 | 0.1 | 0.1 | 0.1 | 0.1 | 0.1 | 0.1 | 0.1 | 0.1 | 0.1 | 0.1 | 0.1 | 0.1 |
| Copper | 0.09 | 0.09 | 0.09 | 0.09 | 0.09 | 0.09 | 0.09 | 0.09 | 0.09 | 0.09 | 0.09 | 0.09 | 0.09 |

TABLE 9

(H)

(ppm)

| | Stock solution | 1 | 2 | 3 | 4 | 5 | 6 | 7 | 8 | 9 | 10 | 11 | 12 | 13 |
|---|---|---|---|---|---|---|---|---|---|---|---|---|---|---|
| Nickel | 0.1 | 0.09 | 0.09 | 0.08 | 0.09 | 0.1 | 0.1 | 0.1 | 0.1 | 0.03 | 0.04 | 0.05 | 0.07 | 0.09 |
| Copper | 0.09 | 0.09 | 0.09 | 0.06 | 0.09 | 0.08 | 0.09 | 0.08 | 0.09 | 0.02 | 0.04 | 0.04 | 0.08 | 0.09 |

| | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| Nickel | 0.1 | 0.1 | 0.09 | 0.1 | 0.09 | 0.1 | 0.1 | 0.05 | 0.09 | 0.08 | 0.08 | 0.03 | 0.07 | 0.09 |
| Copper | 0.09 | 0.09 | 0.08 | 0.09 | 0.08 | 0.09 | 0.09 | 0.05 | 0.09 | 0.07 | 0.08 | 0.03 | 0.06 | 0.08 |

| | 28 | 29 | 30 | 31 | 32 | 33 | 34 | 35 | 36 | 37 | 38 | 39 | 40 |
|---|---|---|---|---|---|---|---|---|---|---|---|---|---|
| Nickel | 0.09 | 0.1 | 0.04 | 0.09 | 0.09 | 0.09 | 0.1 | 0.1 | 0.09 | 0.1 | 0.09 | 0.1 | 0.1 |
| Copper | 0.09 | 0.09 | 0.02 | 0.08 | 0.08 | 0.09 | 0.09 | 0.09 | 0.09 | 0.09 | 0.08 | 0.09 | 0.09 |

In Tables 2 to 9 in Example 1 using 28% ammonia water, the weakly-basic ion exchange fiber (B) in Table 3 and the weakly-basic ion exchange resin (C) in Table 4 expressed a high removal ability of the nickel chelate complex and the copper chelate complex. Meanwhile, the removal ability of the strongly acidic ion exchange resin (F) in Table 7 and the weakly acidic anion exchange resin (G) in Table 8 could not be confirmed. It was confirmed that the removal ability of both chelate complexes by the chelate fiber (H) in Table 9 could be confirmed depending on a kind of the chelating agent.

All the chelating agents used are water soluble and dissolved as anions in the alkaline solution. They are also in an anion state even in a state of forming the nickel and copper and the chelate complex. As indicated by the results of Example 1, it can be confirmed from the facts that the weakly-basic ion exchange fiber and the weakly-basic ion exchange resin exhibited a high removal ability of chelate complex, and the strongly acidic and weakly acidic ion exchange resins did not exhibit the removal ability of chelate complex. But, it is seen that the strongly basic ion exchange fiber (A) of Table 2, the strongly basic ion exchange resin (type I) (D) of Table 5 and the strongly basic ion exchange resin (type II) (E) of Table 6 have very low removal ability, or such ability cannot be confirmed. The reason is presumed that the 28% ammonia water used in this example is an alkaline solution, the chelate complex dissolved in the anion state within the sample solution is not adsorbed by the quaternary ammonium group, and the reaction advances toward regeneration of the resin adsorbed by the hydroxide ion (OH—) in the solution.

There is a tendency that the removal ability of the basic ion exchange resin (type II) is stronger than the strongly basic ion exchange resin (type I). And, the reason is considered that the type II has lower alkalinity than the type I, and the chelate complex was adsorbed though in a trace amount.

It can be said that when the chelate fiber has a chelate force to nickel or copper higher than the added chelating agent, the chelate fiber can remove nickel or copper by taking it from the formed chelate complex.

All Tables 2 to 9 in Example 1 show the results obtained by using the column, but the results obtained according to the batch method exhibited the same tendency as those obtained by using the column.

Example 2

The above-described treatment operation was performed by using an aqueous 25% tetramethylammonia hydroxide solution as a sample solution.

In Example 2 using the aqueous 25% tetramethylammonia hydroxide solution, both concentrations of nickel and copper in stock solution were 0.1 ppm and became 0.01 ppm or below after treatment by the weakly-basic ion exchange resin and the weakly-basic ion exchange fiber in the same manner as in Example 1, indicating that it was possible to remove the nickel chelate complex and the copper chelate complex. And, similar to Example 1, because of the reasons described above, sufficient removal ability of nickel chelate complex and copper chelate complex could not be obtained by the strongly acidic ion exchange resin, the weakly acidic ion exchange resin, the strongly basic ion exchange resin (type I), the strongly basic ion exchange resin (type II) and the chelate fiber.

Example 3

The above-described treatment operation was performed by using an aqueous 48% sodium hydroxide solution as a sample solution.

Both concentrations of nickel and copper in the stock solution were 0.1 ppm in Example 3 using the aqueous 48% sodium hydroxide solution, but the concentrations became 0.01 ppm or below after treatment by the weakly-basic ion exchange resin and the weakly-basic ion exchange fiber in the same manner as in the above-described Example 1 and 2, indicating that the nickel chelate complex and the copper chelate complex could be removed. Similar to Examples 1 and 2, because of the reasons described above, the sufficient removal ability of nickel chelate complex and copper chelate complex could not be obtained by the strongly acidic ion exchange resin, the weakly acidic ion exchange resin, the strongly basic ion exchange resin (type I), the strongly basic ion exchange resin (type II) and the chelate fiber.

Example 4

The above-described treatment operation was performed by using an aqueous 48% potassium hydroxide solution as a sample solution.

Both concentrations of nickel and copper in the stock solution were 0.1 ppm in Example 4 using the aqueous 48% potassium hydroxide solution, but the concentrations became 0.01 ppm or below after treatment by the weakly-basic ion exchange resin and the weakly-basic ion exchange fiber in the same manner as in the above-described Examples 1 and 3, indicating that the nickel chelate complex and the copper chelate complex could be removed. Similar to Examples 1 to 3, because of the reasons described above, the sufficient removal ability of nickel chelate complex and copper chelate complex could not be obtained by the strongly acidic ion exchange resin, the weakly acidic ion exchange resin, the strongly basic ion exchange resin (type I), the strongly basic ion exchange resin (type II) and the chelate fiber.

Example 5

The above-described treatment operation was performed by using an aqueous 23% sodium carbonate solution as a sample solution. Both concentrations of nickel and copper in the stock solution were 0.1 ppm in Example 5 using the 23% sodium carbonate solution, but the concentrations became 0.01 ppm or below after treatment by the weakly-basic ion exchange resin and the weakly-basic ion exchange fiber in the same manner as in the above-described Examples 1 to 4, indicating that the nickel chelate complex and the copper chelate complex could be removed. Similar to Examples 1 to 4, because of the reasons described above, the sufficient removal ability of nickel chelate complex and copper chelate complex could not be obtained by the strongly acidic ion exchange resin, the weakly acidic ion exchange resin, the strongly basic ion exchange resin (type I), the strongly basic ion exchange resin (type II) and the chelate fiber.

Example 6

The above-described treatment operation was performed by using an aqueous 50% potassium carbonate solution as a sample solution. Both concentrations of nickel and copper in the stock solution were 0.1 ppm in Example 6 using the 50% potassium carbonate solution, but the concentrations became 0.01 ppm or below after treatment by the weakly-basic ion exchange resin and the weakly-basic ion exchange fiber in the same manner as in the above-described Examples 1 to 5, indicating that the nickel chelate complex and the copper chelate complex could be removed. Similar to Examples 1 to 5, because of the reasons described above, the sufficient removal ability of nickel chelate complex and copper chelate complex could not be obtained by the strongly acidic ion exchange resin, the weakly acidic ion exchange resin, the strongly basic ion exchange resin (type I), the strongly basic ion exchange resin (type II) and the chelate fiber.

Example 7

The above-described treatment operation was performed by using an aqueous 8% sodium hydrogencarbonate solution as a sample solution. Both concentrations of nickel and copper in the stock solution were 0.1 ppm in Example 7 using the 8% sodium hydrogencarbonate solution, but the concentrations became 0.01 ppm or below after treatment by the weakly-basic ion exchange resin and the weakly-basic ion exchange fiber in the same manner as in the above-described Examples 1 to 6, indicating that the nickel chelate complex and the copper chelate complex could be removed. Similar to Examples 1 to 6, because of the reasons described above, the sufficient removal ability of nickel chelate complex and copper chelate complex could not be obtained by the strongly acidic ion exchange resin, the weakly acidic ion exchange resin, the strongly basic ion exchange resin (type I), the strongly basic ion exchange resin (type II) and the chelate fiber.

Example 8

The above-described treatment operation was performed by using an aqueous 50% potassium hydrogencarbonate solution as a sample solution. Both concentrations of nickel and copper in the stock solution were 0.1 ppm in Example 8 using the 50% potassium hydrogencarbonate solution, but the concentrations became 0.01 ppm or below after treatment by the weakly-basic ion exchange resin and the weakly-basic ion exchange fiber in the same manner as in the above-described Examples 1 to 7, indicating that the nickel chelate complex and the copper chelate complex could be removed. Similar to Examples 1 to 7, because of the reasons described above, the sufficient removal ability of nickel chelate complex and copper chelate complex could not be obtained by the strongly acidic ion exchange resin, the weakly acidic ion exchange resin, the strongly basic ion exchange resin (type I), the strongly basic ion exchange resin (type II) and the chelate fiber.

Example 9

The above-described treatment operation was performed by using an aqueous 75% choline solution as a sample solution. Both concentrations of nickel and copper in the stock solution were 0.1 ppm in Example 9 using the 75% choline solution, but the concentrations became 0.01 ppm or below after treatment by the weakly-basic ion exchange resin and the weakly-basic ion exchange fiber in the same manner as in to the above-described Examples 1 to 8, indicating that the nickel chelate complex and the copper chelate complex could be removed. Similar to Examples 1 to 8, because of the reasons described above, the sufficient removal ability of nickel chelate complex and copper chelate complex could not be obtained by the strongly acidic ion exchange resin, the weakly acidic ion exchange resin, the strongly basic ion exchange resin (type I), the strongly basic ion exchange resin (type II) and the chelate fiber.

Example 10

The above-described treatment operation was performed by using a slurry SS25 stock solution as a sample solution. Both concentrations of nickel and copper in the stock solution were 0.1 ppm in Example 10 using the semiconductor polishing slurry SS25 stock solution, but the concentrations became 0.01 ppm or below after treatment by the weakly-basic ion exchange resin and the weakly-basic ion exchange fiber in the same manner as in the above-described Examples 1 to 9, indicating that the nickel chelate complex and the copper chelate complex could be removed. Similar to Examples 1 to 9, because of the reasons described above, the sufficient removal ability of nickel chelate complex and copper chelate complex could not be obtained by the strongly acidic ion exchange resin, the weakly acidic ion exchange resin, the strongly basic ion exchange resin (type I), the strongly basic ion exchange resin (type II) and the chelate fiber.

Example 11

Using 48% sodium hydroxide as a sample solution, a flat film having (I) and (B) woven therein as shown in FIG. 1 was loaded on the PTFE film testing holder 47Ø, and a chelate complex of copper and nickel of EDTA was added and supplied. The results are shown in Table 10.

TABLE 10

|  | Stock solution | (I) | Film shape (B) (ppm) |
|---|---|---|---|
| Nickel | 0.1 | 0.03 | 0.04 |
| Copper | 0.1 | 0.03 | 0.02 |

In Example 11 using the 48% sodium hydroxide as the sample solution and the weakly-basic anionic exchange membrane (I) and the flat film of the weakly-basic anion exchange fiber (B) in the PTFE film testing holder 47Ø, removal of the copper and nickel complex by both the (I) and the (B) flat film were recognized as shown in Table 10.

INDUSTRIAL APPLICABILITY

The present invention can be used extensively for purifying a chemical containing a compound having a chelating ability.

What is claimed is:

1. A method for purifying a chelating agent-added chemical to purify a chemical containing a compound having a chelating ability used in a semiconductor production process, comprising:

treating the chemical with an organic complex adsorbing material, which has a functional group represented by formula (1), to remove a chelate complex which is formed from nickel and copper, which are impurity metals contained in the chemical, and a compound that comprises a substance for forming an anion in an alkaline aqueous solution and has a chelating ability:

[Chemical formula 1]

(1)

(wherein, R1 in the formula (1) denotes a hydrogen atom, and R2 and R3 denote the same or different alkyl group having a carbon number of 1 to 4).

2. The method for purifying a chelating agent-added chemical according to claim 1, wherein the chemical is a polishing slurry for a semiconductor or an aqueous solution or an aqueous dispersion containing at least one kind selected from ammonia, tetramethylammonium, sodium hydroxide, potassium hydroxide, sodium carbonate, potassium carbonate, sodium hydrogencarbonate, potassium hydrogencarbonate and choline.

3. The method for purifying a chelating agent-added chemical according to claim 1, wherein the chemical is a polishing slurry for a semiconductor containing at least one kind selected from ammonia, tetramethylammonium, sodium hydroxide, potassium hydroxide, sodium carbonate, potassium carbonate, sodium hydrogencarbonate, potassium hydrogencarbonate and choline.

4. The method for purifying a chelating agent-added chemical according to claim 1, wherein the compound having a chelating ability contained in the chemical is composed of at least one kind selected from amines, aminocarboxylic acids, hydroxylamines, phosphoric acids, thio compounds and another compound having at least one functional group having a chelating ability of those compounds.

5. The method for purifying a chelating agent-added chemical according to claim 1, wherein the organic complex adsorbing material has a bead shape, a fiber shape or a film shape.

6. The method for purifying a chelating agent-added chemical according to claim 1, wherein the organic complex adsorbing material is filled in one kind or two kinds or more into a column or a tower and filled in a mixed or layered form when used in two kinds or more, and the chemical is passed into the column or the tower.

7. The method for purifying a chelating agent-added chemical according to claim 6, wherein the column or the tower is connected in a plurality of numbers.

8. The method for purifying a chelating agent-added chemical according to claim 1, wherein the organic complex adsorbing material and the chemical are housed in a reaction vessel, and the chemical is flown in the reaction vessel and filtered.

* * * * *